2,841,527
MEDICINAL EMULSIONS

Louis Freedman, Mount Vernon, A. Jay Merritt, New Rochelle, and Jacques Breitbart, New York, N. Y., assignors to U. S. Vitamin Corporation, New York, N. Y., a corporation of Delaware No Drawing. Application November 7, 1955
Serial No. 545,546

6 Claims. (Cl. 167—77)

This invention relates to medicinal emulsions for topical application to effect the alleviation or cure of various acute and chronic skin diseases which will be herein referred to generically as "dermatoses," and which include such skin diseases as atopic dermatitis, nummular dermatitis, and various forms of eczema which are resistant or unresponsive to heretofore known treatments.

Although the steroid hydrocortisone, in the form of one of its esters, such as the acetate, or in the form of its free alcohol, has been used with some good results in the treatment, by topical application, of various types of pruritic dermatoses intractable to heretofore known treatment, the presently known method of using hydrocortisone topically has a number of disadvantages which tend to reduce its effectiveness. The relatively high dosage level of the steroid, ranging from 2% to 5%, while effective therapeutically, has been reported to have a reduced effectiveness, and is excessively costly to the user, on prolonged use.

We have discovered that hydrocortisone, in the form of its crystalline ester, such as the acetate, but preferably in the form of its free alcohol, (crystalline or amorphous) has a relatively high degree of therapeutic effectiveness when used conjointly with pantothenyl alcohol, as when incorporated with the latter in an emulsion base. Instead of requiring 2% and more of the costly steroid, 1.% or less, or as little as 0.1 to 0.2% of the steroid, when used with pantothenyl alcohol, in an emulsified base, particularly our preferred base composition, suffices to give, by clinical tests, results equal to, or superior to more concentrated levels of the steroid used without the simultaneous use of the pantothenyl alcohol.

A suitable emulsion base may be prepared by any of the well known methods from water, a fatty alcohol, which may be cetyl alcohol, and a fatty ingredient which may be spermaceti, and preferably with various other ingredients usually used in emulsions, creams, and preferably containing an emulsifant. By suitable proportioning of the water and the various other ingredients, the emulsified composition may be prepared in the form of a combination cream or paste, preferably of sufficient density to insure against settling out of the medicinal ingredients, which facilitates topical application in uniform amounts to the affected areas of the skin.

Our composition is also characterized by the fact that the medicinal ingredients, comprising hydrocortisone and pantothenyl alcohol, are, by virtue of a high degree of interspersibility one in the other and in the ingredients making up the emulsion, in intimate association throughout the emulsion. The pantothenyl alcohol being water-soluble, is readily dispersed in the composition; the hydrocortisone used either in the form of its alcohol or acetate is relatively insoluble in water and is, therefore, dispersed in a finely ground state before being incorporated in the composition, a particle size of less than 100 microns having been found desirable.

With respect to the amounts of the medicinal ingredients in our compositions, we have found that good results can be obtained by using from 0.1% to 2.5%, and preferably about 1% of hydrocortisone, and from 1% to 5%, but preferably about 2% of pantothenyl alcohol. While the amounts and proportions of the medicinal ingredients may be varied within these limits, we have found it desirable for most purposes to use about twice the amount of pantothenyl alcohol to hydrocortisone, but the amount of pantothenyl alcohol should in any case be not less than 0.5%.

As an illustrative example, the following methods of making the emulsion in the form of a cream or paste are given, it being understood that if one wishes to make a lotion-type of product, that and other variations may be made by one skilled in the art without departing from the spirit of the invention disclosed and claimed herein:

Example I

| | Percent |
|---|---|
| Cetyl alcohol | 15 |
| Spermaceti | 5 |
| Sodium lauryl sulfate | 1 |
| Glycerin | 5 |
| Pantothenyl alcohol | 2 |
| Hydrocortisone alcohol | 1 |
| Water, q. s | 100 |

Example II

| | Percent |
|---|---|
| Cetyl alcohol | 15 |
| Spermaceti | 5 |
| Sodium lauryl sulfate | 1 |
| Glycerin | 5 |
| Pantothenyl alcohol | 2 |
| Hydrocortisone acetate | 1 |
| Water, q. s | 100 |

In making the above described emulsions, we adjust the temperature of the fat-soluble ingredients and the water-soluble ingredients separately to about 75° C., after which they are mixed and emulsified at that temperature. However, we withhold a portion of the glycerin, the water, and the emulsifant, with which we make a slurry of the finely divided hydrocortisone. The slurry is then homogenized to disperse the hydrocortisone and is added to the emulsion at a temperature of about 60° C. and thoroughly mixed. If a cream or paste form of product is produced, the final emulsion is then cooled until it congeals, and is ready for filling into tubes or jars; otherwise, it may be bottled with directions to "shake well before using."

Our medicinal emulsions can be applied topically one or more times a day; and by numerous clinical tests have been found to be effective in various types of dermatoses previously found to be unresponsive to, or with little or no relief from heretofore known treatment.

More unexpectedly, our compositions have been found to give effective results in many cases where no relief was obtained by topical application of hydrocortisone alone. In fact, some of the results of clinical tests indicate there may be a synergistic action between the hydrocortisone and the pantothenyl alcohol, which may account for the greater effectiveness of our described compositions. This was particularly true in those cases where pruritus was one of the characteristic and dominant symptoms.

Having described our invention, what we claim is:

1. A composition for topical application, comprising an aqueous-fatty base emulsion containing pantothenyl alcohol and at least one of the group consisting of hydrocortisone alcohol and a crystalline, fatty acid ester of hydrocortisone.

2. The composition of claim 1, in which the fatty acid ester is the acetate.

3. The composition of claim 1, in which the pantothenyl alcohol and hydrocortisone components are in the ratio of from 2:1 to 10:1.

4. The composition of claim 1, in which the pantothenyl alcohol is present in an amount of from 0.5% to 5%, and the hydrocortisone component is present in an amount of from 0.1% to about 2.5%.

5. The composition of claim 1, in which the pantothenyl alcohol is present in an amount of about 2%, and the hydrocortisone component is present in an amount of about 1%.

6. The method of making the composition of claim 1, which comprises emulsifying water and the fatty base, incorporating the pantothenyl alcohol, homogenizing the hydrocortisone component in an aqueous medium to effect an intimate dispersion thereof, and thoroughly mixing the dispersion into the emulsified ingredients to form an emulsion therewith.

References Cited in the file of this patent

Modern Drug Encyclopedia, 5th ed., 1952, p. 705.

Drug and Cosmetic Industry, July 1952, vol. 71, No. 1, p. 91.

Welsh et al.: Ohio State Med. Jour., vol. 50, No. 9, September 1954, pp. 837–840.